March 15, 1938.  A. B. POOLE  2,111,193

SYNCHRONOUS TIMING DEVICE

Filed Feb. 8, 1936

Arthur B Poole
INVENTOR.

Patented Mar. 15, 1938

2,111,193

UNITED STATES PATENT OFFICE 2,111,193

SYNCHRONOUS TIMING DEVICE

Arthur B. Poole, Bristol, Conn., assignor to H. C. Thompson Clock Company, Bristol, Conn., a corporation of Connecticut Application February 8, 1936, Serial No. 62,957

6 Claims. (Cl. 161—15)

My invention is a synchronous electric timing device particularly adapted to be run from a regulated alternating current used to furnish light and power.

One of the objects of my invention is to provide a synchronous motor driven timing device or stopwatch in which the time keeping element is kept in constant motion regardless of whether the time indicating means such as the hands are in motion or not.

Another object of my invention is the provision of a novel means for connecting and disconnecting the time keeping element of a synchronous motor from the time indicating element of a clock such as the hands.

The above and other objects of my invention will be set forth in the following specifications and claims and will be apparent to those skilled in the art.

Figure 1:
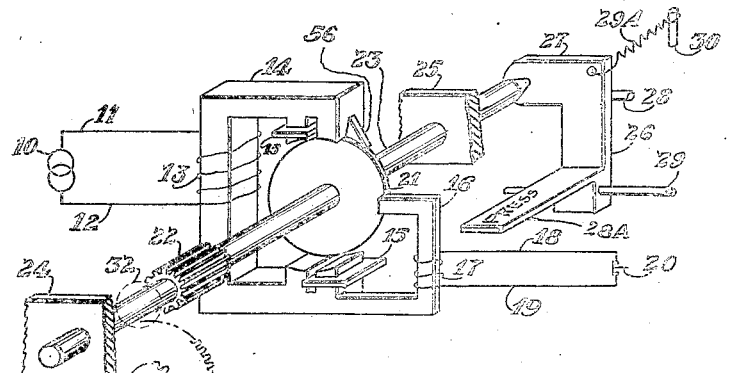
Figure 2:
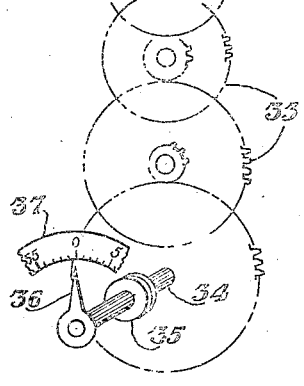
Figure 2:
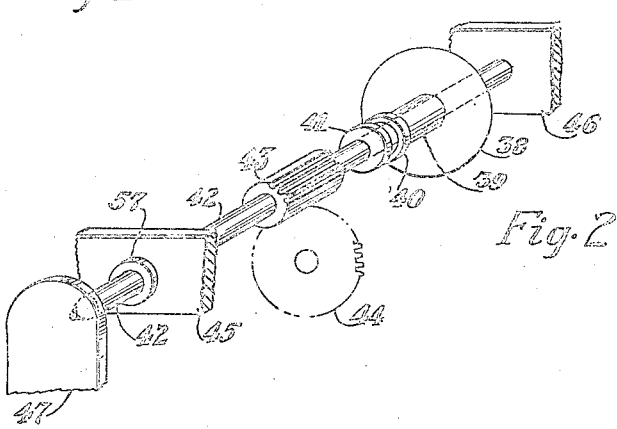
Figure 3:
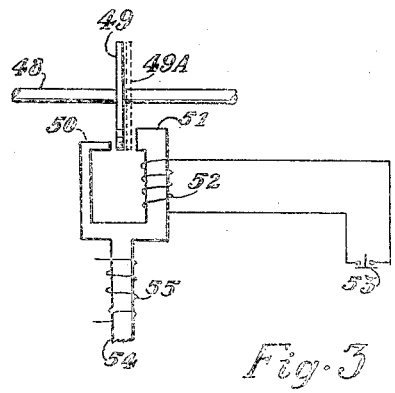

My invention will be best understood by referring to the accompanying drawing of which Fig. 1 is a more or less diagrammatic view of a clock embodying my invention, Fig. 2 and Fig. 3 are views showing modifications of Fig. 1 which I consider within the scope of my invention.

Referring now to the figures; 10 represents an alternator which is operated to produce a time controlled source of alternating current; 11 and 12 are line wires connecting said alternator to a coil 13 of a synchronous motor clock; said coil produces a flux which flows in field structure 14 and acts on a rotor 21 to produce synchronous rotation of said rotor. A portion of said field is caused to be time lagged by means of two shading coils 15, all of the foregoing in a manner well known to those skilled in the art.

The rotor 21 is fixed to shaft 23 which is supported in bearings 24 and 25. Mounted on the shaft 23 is a pinion 22 which is able to mesh with wheel 31 which in turn through gear train 33 drives shaft 34 on which is mounted a hand 36 which co-acts with a scale 37. On the shaft 34 is a clutch 35 by means of which the hand 36 may be reset to any desired position at will.

Returning now to the rotor shaft 23 said shaft is so arranged that it may travel in a longitudinal direction so that pinion 22 may be moved forward to a position 32 shown by a dotted line. It should be explained here that when the pinion 22 is in the position shown it does not mesh with the gear 31, but when it is in the position 32 it will mesh with the gear 31.

I will now describe the means for determining the position which the rotor takes in the field. On the field 14 is a small lug 56 which is connected to the rest of the field therefore causes the rotor to align itself with this member said alignment referring to the longitudinal position of the rotor. Also on the field 14 is a projection 16 which is displaced to one side of the lug 56 as can be observed from the drawing. On the projection 16 is a coil 17 which is connected by connecting wires 18 and 19 to a switch 20.

An additional means for shifting the motor endways is also provided in the lever arm 26 having a projection 27 which contacts with the end of the shaft 23 said lever arm being pivoted on shaft 29 and impelled against stop 28 by means of spring 29A which is fastened to 26 on one end and to a pin 30 on the other. Integral with lever arm 26 is lever 28A which has a provision for being pressed by the finger as indicated in the drawing.

Fig. 2 is a modification of Fig. 1 in which the rotor 38 is mounted on a sleeve 39 on the end of which is a clutch member 40 which co-acts with the complementary member 41 which in turn is rigidly fastened to shaft 42 on which is mounted rigidly a pinion 43 which meshes with gear 44 said gear corresponding to gear 31 in Fig. 1. Shaft 42 is mounted in bearing plates 45 and 46 and is restrained from end motion by means of end plate 47 and thrust collar 57.

Fig. 3 is a diagrammatic representation of a modification of the magnetic rotor shifting means shown in Fig. 1. 49 is a rotor which is mounted on shaft 48. Said rotor turns between two field lugs 50 and 51. Lug 51 is considerably larger than lug 50 and mounted on it is a coil 52 which is controlled by switch 53. Flux is caused to flow in field 54, which is connected to members 50 and 51, by means of a coil 55.

I will now describe the operation of the mechanism of my invention. When the coil 13 is energized the rotor 21 immediately starts to revolve at synchronous speed. Since the switch 20 is closed a current will be induced in coil 17 which in turn will cause an opposing flux to be set up in member 16 so that the net amount of flux flowing in 16 will be of negligible proportion consequently the rotor will tend to take up a position in line with lug 56. As stated before this position is such that the pinion 22 will be withdrawn from mesh with the gear 31.

We will assume that the hand 36 is set at zero on the dial 37 as shown. Now if it is desired to use this mechanism to time some phenomena, all that is necessary to do is to open switch 20 which will result in the cessation of the opposing flux which is generated in 16 by virtue of the current flowing through the circuit comprising 18, 19, 20 and the coil 17. Immediately this will allow a flux of appreciable proportion to flow through the member 16. This member since it presents a larger angle of influence on the rotor than lug 56 will pull the rotor away from lug 56 into alignment with projection 16. This end shifting of the rotor will of course cause the pinion 22 to move to the position 32 immediately meshing with the gear 31 whereupon the hand 36 will start to indicate the lapse of time. When it is desired to stop the hand 36 the switch 20 is closed. This reduces the influence of member 16 on the rotor to a smaller amount than that of member 56 consequently the rotor returns to its original position. It will be understood that the gears 31, 33, etc., have a small enough inertia and a large enough friction on their bearings so that the instant the pinion 22 is withdrawn from mesh with the gear 31 the whole train will come to a stop and the hand 36 will indicate very accurately the elapsed time.

It is recognized that it is old in the art to provide a timing device with a synchronous motor which motor is turned on when the timing period starts and turned off when the timing period ends. However this method is open to serious disadvantage on two counts: First, that it takes an appreciable amount of time varying from four to fifteen cycles for the rotor to attain synchronous speed particularly if it has considerable inertia. Contrarywise when the timing period is ended the rotor will have a tendency to keep on revolving which tendency must be counteracted by using a more or less complicated brake mechanism. Both of these factors tend to produce inaccuracy which will vary with various conditions pertaining to the motor such as low voltage and the state of the lubrication of the rotor bearings.

My invention by providing that the rotor runs all the time whether the time indicator is moving or not eliminates these sources of error and thus provides a distinct improvement over prior structures. I prefer to use the magnetic form of rotor shifting device as previously described since it is more certain in action and is more dependable in that the control may be made from a point remote from the clock by means of extending the wires 18 and 19. However, I have also shown a means in the form of a lever arm 26 by which the rotor can be moved by pressing the lever 28A at the point marked "Press".

A modification of Fig. 1 is shown in Fig. 2 in which instead of disengaging gears 43 and 44 the disconnection of the rotor from the rest of the train is accomplished by the clutch members 40 and 41 in a manner which will be understood by those skilled in the art. It is understood that in this form the magnetic rotor shift means would be preferred.

Fig. 3 shows a modification of the magnetic rotor shifting means in which the members 50 and 51 which correspond respectively to members 56 and 16 in Fig. 1, are placed by the side of the rotor rather than around it. The member 51, as shown, is somewhat larger than the member 50, hence, when the coil 52 is open circuited the rotor is more strongly attracted by 51 than by 50 and takes up position shown by the dotted lines 49A. When the coil 52 is closed circuited, the attraction of 51 is nullified and the rotor is pulled by 50 to position 49. This modification results in a somewhat more positive action. It is understood that the rotor shaft 48 in this form will have some form of thrust bearing at each end which will prevent the rotor from actually contacting the pole projection 50 or 51. The coil 55 may be an entirely distinct coil from the motor field coil or the flux in the member 54 may be delivered from the motor field coil itself as in Fig. 1.

Many changes and modifications may be made in the construction herein shown without departing from the spirit of my invention since I claim:

1. In a synchronous electric timing device, the combination of a synchronous motor comprising a field structure and a rotor, a magnetizable projection on said field displayed toward said rotor and having magnetic influence on said rotor whereby the longitudinal position of said rotor is determined, a second projection on said field placed in offset relation to said first projection and having less influence on said rotor than said first projection, means for decreasing the energization of said first projection, whereby said rotor will operate in either of two longitudinal positions, depending on the condition of said first projection, a gear train, connecting means between said rotor and said gear train, said connecting means being acted on by said rotor to connect said rotor and said gear train when said rotor is in one of said positions, and to disconnect said rotor from said gear train when said rotor is in said other position and time indicating means driven by said gear train.

2. In a synchronous electric timing device, the combination of a synchronous motor comprising a field structure and a rotor, a magnetizable projection on said field displayed toward said rotor and having a magnetic influence on said rotor whereby the longitudinal position of said rotor is determined, a second magnetizable projection on said field placed in offset relation to said first projection and having less influence on said rotor than said first projection, an electromagnetic coil on said first projection, means for connecting the ends of said coil together to form a closed loop, whereby the energization of said first projection is decreased when said closed loop is formed, whereby said rotor will operate in either of two longitudinal positions, depending on the condition of said first projection, a gear train, connecting means between said rotor and said gear train, said connecting means being acted on by said rotor to connect said rotor and said gear train when said rotor is in one of said positions, and to disconnect said rotor from said gear train when said rotor is in said other position and time indicating means driven by said gear train.

3. In a synchronous electric timing device, the combination of a synchronous motor comprising a coil, a field structure and a rotor, the portion of said field structure adjacent to said rotor being substantially in the same plane as said rotor whereby when said coil is energized said rotor will run in a normal definite longitudinal position with respect to said adjacent field structure, a shaft capable of longitudinal motion for mounting said rotor, a gear on said shaft, a second gear positioned to mesh with said first gear when said rotor is displaced from said normal position, time indicating means driven by said second gear, a projection on said field structure capable of transmitting flux to said rotor, said projection being positioned with respect to said rotor so as to displace said rotor longitudinally from said definite longitudinal position when the flux density in said projection is greater than a predetermined amount, and means for controlling the flux density in said projection.

4. In a synchronous electric timing device, the combination of a synchronous motor comprising a coil, a field structure and a rotor, the portion of said field structure adjacent to said rotor being substantially in the same plane as said rotor whereby when said coil is energized said rotor will run in a normal, definite longitudinal position with respect to said adjacent field structure, a shaft capable of longitudinal motion for mounting said rotor, said shaft also bearing one part of a clutch member, a second shaft so adapted to be concentric with said first shaft but being relatively restrained from longitudinal motion, said shaft bearing a second co-acting part of said clutch member, a gear on said second shaft, time indicating means driven by said gear, a projection on said field structure capable of transmitting flux to said rotor, said projection being positioned with respect to said rotor so as to displace said rotor longitudinally from said definite longitudinal position when the flux density in said projection is greater than a predetermined amount, and means for controlling the flux density in said projection.

5. In a synchronous electric timing device, a synchronous motor comprising a field structure and a relatively thin rotor, supporting means for said rotor so arranged that said rotor may shift longitudinally with respect to said field structure, a magnetizable member so placed with respect to said rotor that said member is enabled, when magnetized, to attract said rotor longitudinally with a predetermined force in a predetermined direction, a second magnetizable member so placed with respect to said rotor that said member is enabled, when magnetized, to attract said rotor longitudinally in a direction opposite to the direction of attraction of said first member, and with a force greater than said attractive force of said first member, a common means for magnetizing said magnetizable members, a gear train, connecting means between said rotor and said gear train, said connecting means being adapted to connect said rotor and said gear train when said rotor is being attracted by one of said magnetizable means, and to disconnect said rotor and said gear train when said rotor is being attracted by said other magnetizable means, and means for reducing the magnetization of said second magnetizable means without reducing the magnetization of said first magnetizable means.

6. In a synchronous electric timing device, the combination of a synchronous motor having a field structure and a rotor, said rotor capable of being shifted longitudinally, a magnetizable bifurcated member adapted to straddle said rotor, said bifurcated member comprising a first element adapted when said member is magnetized to shift said rotor longitudinally toward said first element with a predetermined force, and a second bifurcation adapted to shift said rotor longitudinally, when said member is magnetized, toward said second element with a force greater than said beforementioned predetermined force, a gear train, connecting means between said rotor and said gear train, said connecting means being acted on by said rotor to connect said rotor and said gear train when said rotor is shifted toward one of said elements, and to disconnect said rotor from said gear train when said rotor is shifted toward said other element, means to reduce the magnetization of said second element, and time indicating means driven by said gear train.

ARTHUR B. POOLE.